(No Model.)
G. SCHUBERT.
GRAIN CONVEYER FOR BINDERS, &c.
No. 470,213. Patented Mar. 8, 1892.
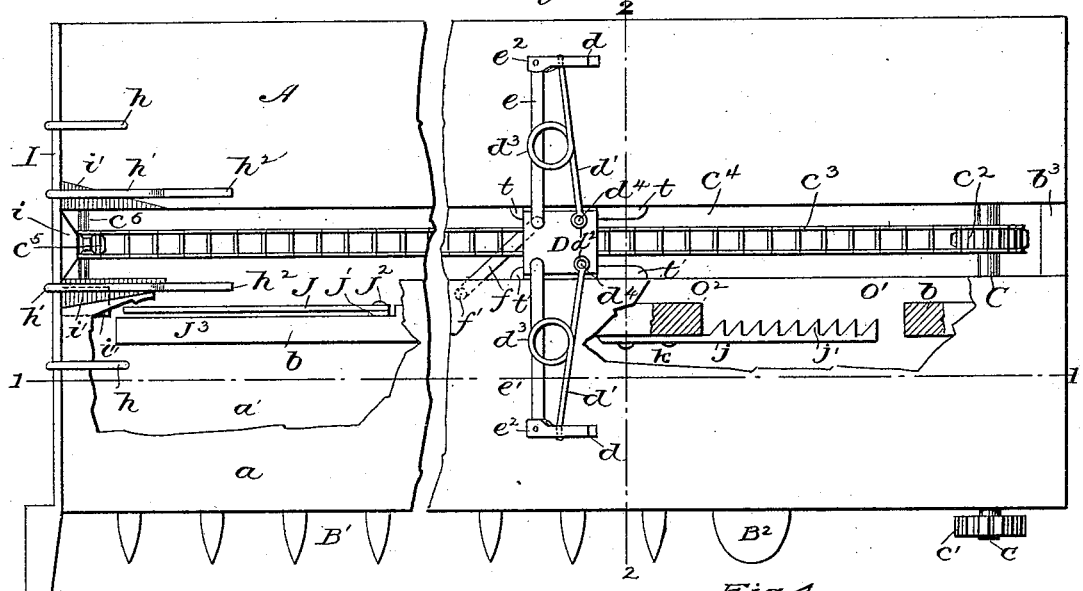
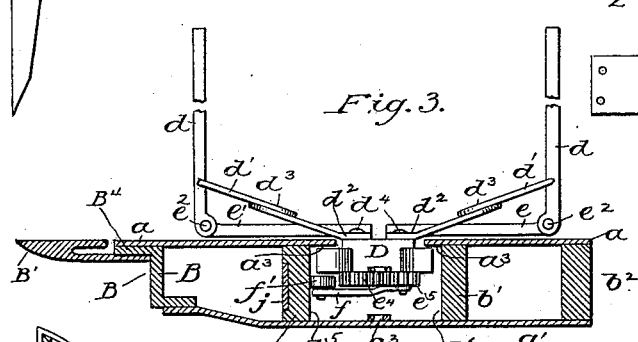
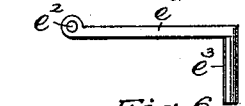
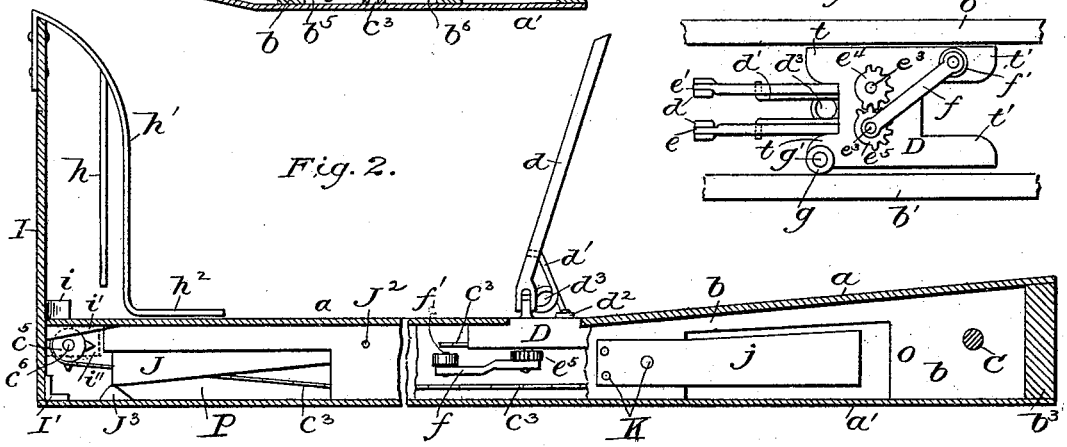
Witnesses:
J. S. Massey
J. F. Tromble
Inventor:
George Schubert

UNITED STATES PATENT OFFICE.

GEORGE SCHUBERT, OF WALNUT, TEXAS.

GRAIN-CONVEYER FOR BINDERS, &c.

SPECIFICATION forming part of Letters Patent No. 470,213, dated March 8, 1892.

Application filed March 20, 1891. Serial No. 385,832. (No model.)

*To all whom it may concern:*

Be it known that I, GEORGE SCHUBERT, a citizen of the United States, residing at Walnut, in the county of Bosque and State of Texas, have invented certain new and useful Improvements in Grain-Conveyers for Binders, &c.; and I do hereby declare the following to be a full, clear, and exact description of the invention, such as will enable others skilled in the art to which it appertains to make and use the same.

This invention relates to improvements in a reciprocating grain-conveyer for binders, &c., in which arms unfold for their forward movement to convey or shift the grain toward the inner or stubble end of the platform, and said arms to automatically fold at the beginning of the outward movement of the conveyer and thus retreat to the far or grainward end of the platform and there unfold for their inward movement and remain unfolded during the inward or stubbleward movement.

The objects of my present improvements are, first, to provide a rack or means by which the arms are automatically folded by the outward movement of the conveyer; second, to provide guards by which a space vacant of grain is obtained in which the arms of the conveyer can unfold, and to construct said guards so that they will retain or prevent the vertical arms from unfolding until they have been moved in the vacant space behind said guards; third, to construct a spring connecting-rod so that the arms can unfold laterally while the vertical arms are yet held down by a guard until they have been moved from underneath the grain and behind the guards and then moved in a vertical position or opened by a spring connecting-rod; fourth, to provide a trap in the wall near the end of the grainward movement of the conveyer by which the lateral arms can start to unfold at the desired time, and remain so unfolded during the inward movement of the conveyer. I attain these objects by the mechanism illustrated in the accompanying drawings, in which—

Figure 1 is a plan view of a harvester-platform provided with my improvements. Fig. 2 is a section view on line 1 1, Fig. 1, the strip $b$ being partly broken away, so as to show the conveyer in full lines. Fig. 3 is a cross-section on line 2 2, Fig. 1, showing the conveyer beyond in full lines. Fig. 4 is a detail view of the toothed spring-guard detached from the strip. Fig. 5 is a view of one of the lateral arms, and Fig. 6 is a view of the under side of the conveyer head or block with its arms folded.

A designates the platform, which is formed of upper and lower plates $a$ and $a'$, which are braced by intervening strips $b$, $b'$, and $b^2$, to which the plates $a$ and $a'$ are secured. The lower plate $a'$ is riveted to the lower flange $B^3$, and the upper plate is secured to the upper flange $B^4$ of the finger-bar B. The strips $b$ and $b'$ form the walls $b^5$ and $b^6$ or a track for the operation of the conveyer, as hereinafter stated. The strip $b^2$ forms the outer rear sill of the platform.

$b^3$ is the cross-sill of the inner or stubble end of the platform.

I designates the grain-board, secured to plates $a$ and $a'$ by angle-irons I' or in any other suitable manner.

The finger-bar B is provided with the usual guard-fingers B' and a shoe B².

C designates a shaft located near the inner or stubbleward end of the platform, with its front bearing secured in the finger-bar B and extending through the strips $b$ and $b'$, with its rear bearing in the sill $b^2$, and provided with a pinion C' on its forward projecting end and a sprocket-wheel C², located in the slot C⁴.

C³ is a chain carried by the sprocket-wheel C² and extending over an idler C⁵, carried by a shaft C⁶, having its bearings in the strip $b'$ and the block $i''$. Said block $i''$ is secured to the plate $a$ and the grain-board I in any suitable manner at the grainward end of the platform.

The slot C⁴ is formed in the upper plate $a$ and of a suitable width for the conveyer to operate therein, with its edges $a^3$ $a^3$ projecting beyond the walls $b^5$ and $b^6$, so as to prevent the conveyer-head from disengaging the slot C⁴.

D designates the conveyer head or block, cut out at each end, forming the projections $t\,t$ and $t'\,t'$, (see Figs. 3 and 6,) so as to approach nearer each end of the platform without coming in contact with the sprocket-wheel C² or the idler C⁵ and secured to the chain C³ in any suitable manner.

$e$ and $e'$ are arms bent at a right angle, or thereabout, to form a pivot $e^3$, which is mounted to extend vertically through and turn in the block D, and provided with segments $e^4$ and $e^5$ on their lower ends, and beneath the block D, and to the lower end of the pivot of the rod $e'$ is secured the arm $f$, provided with the anti-friction roller $f'$. The horizontal portions of the arms $e$ and $e'$ are made to any desired length, which depends to some extent upon the size of the machine and the length of grain to be operated upon.

$d$ $d$ are arms bifurcated at one end, by which they are pivoted to the free ends of the arms $e$ and $e'$, forming the joints $e^2$ $e^2$. Said joints $e^2$ $e^2$ are so constructed that the arms $d$ $d$ can be folded inward with their free ends toward the block D and down on the arms $e$ and $e'$. Said arms $d$ $d$ are connected to the block D by the spring connecting-rods $d'$ $d'$. Said rods $d'$ $d'$ are provided with a hook at one end, which projects through the arms $d$ $d$ and can be headed to prevent their disengaging from said arms, and coiled once or twice at $d^3$ to produce endwise elasticity, and are provided with an eye $d^2$, by which they are secured to the studs $d^4$ $d^4$. Said rods are secured to the arms $d^2$ $d^2$ at a suitable distance from the joints $e^2$ $e^2$, and at a suitable distance in front of the pivots $e^3$ of the arms $e$ and $e'$ are secured on the block D, so as to close the arms $d$ $d$ as the arms $e$ and $e'$ are closed.

$g$ is an anti-friction roller journaled on a stud $g'$, secured in the block D. Said roller is to prevent the block D from rubbing against the strip $b'$ while the roller $f'$ operates on the strip $b$.

$j$ designates a spring-rack or a spring provided with teeth or spurs. Said spring-rack is secured with its smooth end to the strip $b$, with its teeth projecting in the opening $o$ made in the strip $b$, with the end carrying teeth $j'$ projecting stubbleward and located far enough from the end of the platform so that the anti-friction roller $f'$ will be in engagement with the teeth $j'$ of the rack $j$ as the movement of the conveyer is reversed to move grainward, when the roller $f'$ will be retained, the rack $j$ springing back far enough to allow the arm $f$ to reverse its position, thus folding the arms $e$ and $e'$ instead of allowing the arm $f$ to retreat with the conveyer to the shoulder $o^2$, as has heretofore been the practice.

P is an opening in the strip $b$ near the grainward end of the platform, and J is a trap partly closing said slot P. Said trap is pivoted at the end J' to the stud J², secured in the strip $b$. Said trap is cut out or pivoted high enough at the end J' for the roller $f'$ and arm $f$ to enter the slot P (on the grainward movement of the conveyer) beneath the trap J, and thus allow the arms $e$ and $e'$ to unfold at the desired time. The arm $f$ will raise the trap J as the conveyer moves grainward. Said trap will again drop on the block J³ or on the plate $a'$ as the arm $f$ has moved from underneath the trap J, and thus partly closing the slot P, forming a track for the roller $f'$. It will be noticed that on the grainward movement of the conveyer the slack side of the chain is above, thus allowing the conveyer to sink down and allow the roller $f'$ and arm $f$ to enter the slot P.

$i'$ and $i'$ are guides formed by curving down a part of the plate $a$ at the grainward end of the platform and are to guide the arms $e$ and $e'$ on top of plate $a$ as they are pressed outward by the guide $i$. Said guide $i$ is formed triangular or wedge shaped, as shown in Figs. 1 and 2, and secured to the grain-board I in any suitable manner.

$h$ $h$ and $h'$ $h'$ are guides, preferably formed of wire and secured to the grain-board I in any suitable manner, as seen in Fig. 2. They are to prevent the grain from falling too near the grain-board I, thus securing a clear space on the platform within which the arms of the conveyer may unfold. The guards $h'$ $h'$ are provided with a foot or extension $h^2$ $h^2$ to prevent the arms $d$ $d$ from unfolding until they have been moved out from underneath the grain on the platform, after which they will be unfolded within the clear space between the guides $h$ $h$ $h'$ $h'$ and the grain-board I by the spring connecting-rods $d'$ $d'$, which have been compressed by the unfolding of the horizontals arm $e$ and $e'$.

The operation may be summarized as follows, viz: As the conveyer moves inward with its arms unfolded, shifting the grain in front of it, and thus nears the inner or stubble end of the platform, the roller $f'$, nearing the slot $o$, will enter on the rack $j$. Said rack $j$ will yield to the rear to some extent, thereby allowing the arms $e$ and $e'$ to partly fold back as the conveyer is still on its inward movement, while the arms $d$ $d$ will yet remain unfolded by reason of the spring connecting-rods $d'$ $d'$ yielding to the pressure of the grain, thus holding the grain in a suitable position to be encircled by the binder arm or needle and compressing devices, (not shown in the drawings,) and as the movement of the conveyer is reversed the roller $f'$ will be detained on the rack $j$, which will yield, but retain engagement with the roller $f'$ until the position of the arm $f$ is reversed, thus completely folding the arms $e$ and $e'$, while the arms $d$ $d$ will be folded by the action of the spring connecting-rods $d'$ $d'$ as soon as the conveyer has retreated far enough to draw their free ends from out of the gavel of grain, and as the conveyer thus folded nears the grainward end of its movement the free ends of the arms $e$ and $e'$ will come in contact with the guides $i'$ and the guide $i$, and are thus guided upward by the guides $i'$ and laterally by the guide $i$, and are thus unfolded as the conveyer nears the end of its rearward movement. The arms $d$ $d$ are prevented from unfolding by the guards $h'$ $h'$ until their free ends have been drawn from underneath the grain in their grainward movement, when they will be elevated, as heretofore described.

Having thus described my invention, what I claim as new, and desire to secure by Letters Patent, is—

1. The combination of a grain-conveyer, a strip or track having an opening $e$, a spring-rack $j$, secured to the platform, with its free end projecting in the opening $o$ and with its teeth slanting stubbleward, as shown, a trap J near the grain end of the platform, a reciprocating conveyer head or block D to operate in the platform and provided with arms $e$ and $e'$, pivoted in the block D, segments secured to the pivots of the arms $e$ and $e'$, and an arm $f$, secured to the pivot of the arm $e$ and provided with an anti-friction roller $f'$ on its free end to engage with the rack $j$, as and for the purpose described.

2. The combination of a grain-conveyer, a strip or track having an opening $o$, a toothed spring-rack $j$, secured to the platform, with its teeth projecting in the opening $o$ toward the conveyer-block, a trap J near the grain end of the platform, as shown, a reciprocating conveyer head or block D to operate in the platform and provided with arms $e$ and $e'$, pivoted in the block D, segments secured to the pivots of the arms $e$ and $e'$, and an arm $f$, secured to the pivot of the arm $e$ and provided with an anti-friction roller $f'$ on its free end to engage with the rack $j$ for the purpose described, in connection with arms $d\ d$, pivoted to the free ends of the arms $e$ and $e'$ and connected to the block D by spring connecting-rods $d'\ d'$, as shown, and for the purpose described.

3. The combination of a grain-conveyer, a strip or track having an opening $o$, a toothed spring-rack $j$, secured to the platform, with its teeth projecting in the opening $o$, a trap J near the grain end of the platform, as shown, a reciprocating conveyer head or block D to operate in the platform and provided with arms $e$ and $e'$, pivoted in the block D, segments secured to the pivots of the arms $e$ and $e'$, and an arm $f$, secured to the pivot of the arm $e$ and provided with an anti-friction roller $f'$ on its free end to engage with the rack $j$ for the purpose described, in connection with arms $d\ d$, pivoted to the free ends of the arms $e$ and $e'$, and spring and connecting rods $d'\ d'$, having the coil or roll $d^3\ d^3$ and pivoted to the arms $d\ d$ and to the block D, substantially as shown, and for the purpose described.

4. The combination of a grain-conveyer, a strip or track having a slot or opening P near the grain end of the platform, a trap J, pivoted at one end to the platform, with its free end projecting grainward and partly closing the opening P, as shown, and for the purpose described, the inward-projecting edges of the grain end of the plates $a\ a$ curved downward, a triangular or wedge-shaped block $i$, secured to the platform or grain-board near the center of the slot $C^4$, a toothed spring-rack $j$, secured to the platform, with its teeth projecting in the opening $o$, a reciprocating conveyer-block D, provided with arms $e$ and $e'$, intermeshing segments secured to the pivots of the arms $e$ and $e'$, and an arm $f$, secured to the pivot of the arm $e$ and provided with an anti-friction roller, as shown, and for the purpose described.

In testimony whereof I have affixed my signature in presence of two witnesses.

GEORGE SCHUBERT.

Witnesses:
L. H. MANES,
C. E. PESTERFIELD.